(12) United States Patent
Frazier

(10) Patent No.: US 10,016,076 B2
(45) Date of Patent: Jul. 10, 2018

(54) BATTERY SPILL CONTAINMENT SYSTEM AND METHOD OF MAKING THE SAME

(71) Applicant: ENVIRONMENTAL COMPLIANCE SOLUTIONS, LLC, Montclair, CA (US)

(72) Inventor: Douglas Frazier, Claremont, CA (US)

(73) Assignee: Environmental Compliance Solutions, LLC, Montclair, CA (US)

( * ) Notice: Subject to any disclaimer, the term of this patent is extended or adjusted under 35 U.S.C. 154(b) by 148 days.

(21) Appl. No.: 14/267,821

(22) Filed: May 1, 2014

(65) Prior Publication Data

US 2014/0326685 A1    Nov. 6, 2014

Related U.S. Application Data

(60) Provisional application No. 61/818,913, filed on May 2, 2013, provisional application No. 61/918,468, filed on Dec. 19, 2013.

(51) Int. Cl.
| | |
|---|---|
| *A47F 13/00* | (2006.01) |
| *A47B 97/00* | (2006.01) |
| *B65G 1/02* | (2006.01) |
| *A47F 10/00* | (2006.01) |
| *F16N 31/00* | (2006.01) |
| *H01M 2/10* | (2006.01) |
| *B65D 81/26* | (2006.01) |
| *B65D 90/24* | (2006.01) |

(52) U.S. Cl.
CPC .............. *A47F 13/00* (2013.01); *A47B 97/00* (2013.01); *B65G 1/02* (2013.01); *A47F 10/00* (2013.01); *B65D 81/261* (2013.01); *B65D 90/24* (2013.01); *F16N 31/002* (2013.01); *F16N 31/004* (2013.01); *F16N 31/006* (2013.01); *H01M 2/1077* (2013.01); *H01M 2/1094* (2013.01); *Y10T 137/5762* (2015.04)

(58) Field of Classification Search
CPC ..... B65D 81/261; B65D 90/24; F16N 31/002; F16N 31/004; F16N 31/006; Y10T 137/5762; A47F 10/00; A47F 13/00; H01M 2/1077; H01M 2/1094; A47B 97/00; B65G 1/02
USPC .... 220/571, 572, 9.1, 9.2, 560.03; 211/13.1, 211/134, 153; 137/312; 141/86; 248/200
See application file for complete search history.

(56) References Cited

U.S. PATENT DOCUMENTS

| | | |
|---|---|---|
| 1,898,297 A | 2/1933 | Fox |
| 1,958,422 A | 5/1934 | Dinzl |
| 2,119,278 A | 5/1938 | Keller |
| 2,173,736 A | 9/1939 | Thomas |

(Continued)

*Primary Examiner* — J. Gregory Pickett
*Assistant Examiner* — Elizabeth Volz
(74) *Attorney, Agent, or Firm* — Robert J. Lauson, Esq.; Lauson & Tarver, LLP

(57) ABSTRACT

A spill containment assembly for containing fluids, such as battery acid, leaked or spilled from one or more devices stored on a storage rack and thereby prevent contamination of surrounding areas. The spill containment assembly includes a series of wall segments coupled together and a series of adjustable clips for coupling the wall segments to the storage rack. The series of wall segments together define a perimeter of a spill containment chamber for containing the fluids leaked from the one or more devices.

10 Claims, 9 Drawing Sheets

(56) References Cited

U.S. PATENT DOCUMENTS

| | | | |
|---|---|---|---|
| 2,969,863 A | 1/1961 | Woldring et al. | |
| 3,459,696 A | 8/1969 | Read | |
| 3,515,699 A | 6/1970 | Burns et al. | |
| 3,757,990 A | 9/1973 | Buth | |
| 3,938,666 A | 2/1976 | Castleberry | |
| 3,952,907 A | 4/1976 | Ogden et al. | |
| 4,047,166 A | 9/1977 | Miller et al. | |
| 4,112,176 A | 9/1978 | Bailey | |
| 4,270,661 A | 6/1981 | Rosenband | |
| 4,348,466 A | 9/1982 | Elehew et al. | |
| 4,527,707 A * | 7/1985 | Heymann | A47L 15/501 211/126.1 |
| 4,552,166 A | 11/1985 | Chadbourne, Sr. et al. | |
| 4,632,602 A | 12/1986 | Hovnanian | |
| 4,763,796 A | 8/1988 | Flum | |
| 4,765,775 A * | 8/1988 | Kroger | B65D 90/24 405/129.8 |
| 4,790,707 A | 12/1988 | Magretta et al. | |
| 4,947,888 A | 8/1990 | Tanner | |
| 5,090,588 A | 2/1992 | Van Romer et al. | |
| 5,096,087 A | 3/1992 | Thomas | |
| 5,140,744 A | 8/1992 | Miller | |
| 5,160,025 A | 11/1992 | Greenawald | |
| 5,160,051 A | 11/1992 | Bustos | |
| 5,254,415 A | 10/1993 | Williams et al. | |
| 5,270,136 A | 12/1993 | Noland | |
| 5,295,591 A | 3/1994 | Slater | |
| 5,304,434 A | 4/1994 | Stone | |
| 5,316,035 A | 5/1994 | Collins | |
| 5,316,175 A | 5/1994 | Van Romer | |
| 5,389,119 A | 2/1995 | Ferronato et al. | |
| 5,399,445 A | 3/1995 | Tinker | |
| 5,453,596 A * | 9/1995 | Verveniotis | H05B 3/82 219/433 |
| 5,454,195 A | 10/1995 | Hallsten | |
| 5,464,492 A | 11/1995 | Gregory et al. | |
| 5,490,600 A | 2/1996 | Bustos | |
| 5,492,158 A | 2/1996 | Haag | |
| 5,549,178 A | 8/1996 | Yuhas | |
| 5,555,907 A | 9/1996 | Philipp | |
| 5,593,048 A | 1/1997 | Johnson | |
| D385,362 S | 10/1997 | Rossetti | |
| 5,689,920 A | 11/1997 | Hallsten | |
| 5,704,476 A | 1/1998 | Abbott | |
| 5,722,551 A | 3/1998 | Cocciemiglio | |
| 5,775,869 A | 7/1998 | Bishop | |
| 5,865,323 A | 2/1999 | Lecroy | |
| 5,882,142 A | 3/1999 | Siglin et al. | |
| 5,888,604 A | 3/1999 | Evans et al. | |
| 5,948,250 A | 9/1999 | Middleton | |
| 5,975,332 A | 11/1999 | Bishop | |
| 6,102,073 A | 8/2000 | Williams | |
| D431,082 S | 9/2000 | Jaros | |
| 6,135,133 A * | 10/2000 | Ridgeway, Jr. | F24H 9/165 122/504.2 |
| 6,261,714 B1 | 7/2001 | Eidler et al. | |
| 6,265,084 B1 | 7/2001 | Stickler | |
| 6,308,728 B1 * | 10/2001 | Frazier | G01M 3/04 137/15.11 |
| 6,395,417 B1 * | 5/2002 | Frazier | G01M 3/186 220/495.01 |
| 6,695,534 B2 | 2/2004 | Cain et al. | |
| 6,784,272 B2 | 8/2004 | Mack et al. | |
| 6,901,946 B2 * | 6/2005 | Frazier | G01M 3/04 137/15.01 |
| 7,008,719 B2 * | 3/2006 | Zaffino | H01M 2/1077 137/312 |
| 7,124,771 B2 | 10/2006 | Frazier | |
| 7,730,902 B2 * | 6/2010 | Frazier | H01M 2/364 137/15.18 |
| 2007/0181576 A1 * | 8/2007 | Frazier | H01M 2/1016 220/62.22 |
| 2009/0194171 A1 * | 8/2009 | Frazier | H01M 2/364 137/312 |

* cited by examiner

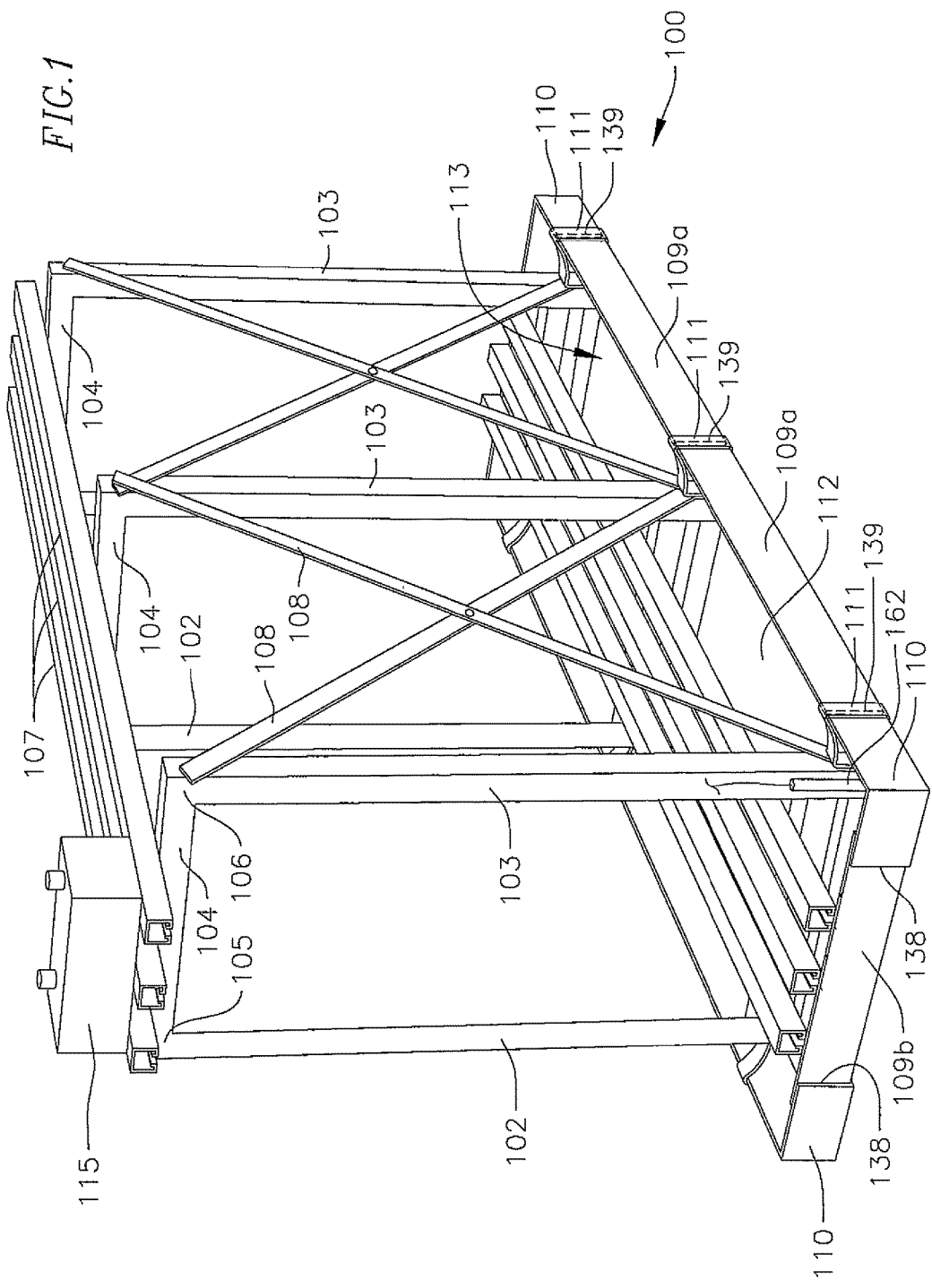

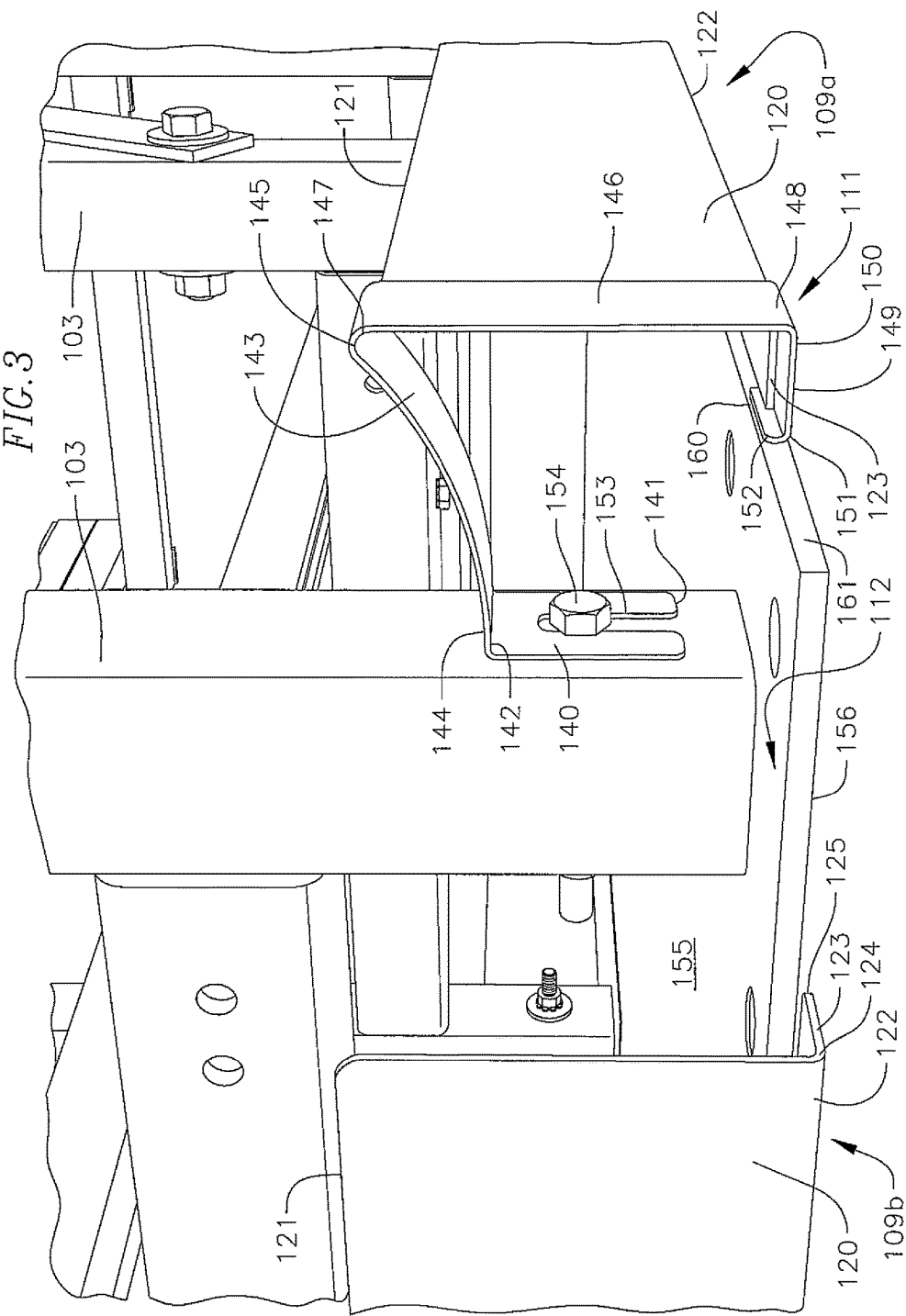

BATTERY SPILL CONTAINMENT SYSTEM AND METHOD OF MAKING THE SAME

CROSS-REFERENCE TO RELATED APPLICATIONS

This application claims priority to and the benefit of U.S. Provisional Application No. 61/818,913, filed May 2, 2013, and U.S. Provisional Application No. 61/918,468, filed Dec. 19, 2013, the entire contents of both of which are incorporated herein by reference.

FIELD

The present disclosure relates generally to spill containment systems and methods for containing a hazardous substance spilled from at least one device and, more particularly, to battery spill containment assemblies and methods for containing spills from battery storage racks.

BACKGROUND

In our industrial society, devices often contain substances that may leak or spill undesirably onto other devices, persons, or the environment. For example, batteries may be stored on battery racks, cabinets, relay racks, a combination of one or more of these structures, or any other suitable structure. These batteries may serve as a backup power supply for data communication centers, telecommunication equipment, utility substations, broadband equipment, cable equipment, and/or computers. These batteries may contain acidic or alkaline substances that may leak or spill onto other batteries, cables, equipment, and other devices as well as personnel, thereby posing a hazard to people and property. Sulfuric acid, commonly found in batteries, is an extremely hazardous material regulated by federal, state and local governments. With respect to the storage of batteries, Article 64 of the Uniform Fire Code requires a four-inch high containment barrier with an acid neutralization capability to a pH of 7-9. Additionally, state and city requirements are often more stringent than National Fire Protection Association ("NFPA") guidelines. In many cases, Valve Regulated Lead Acid (VRLA) batteries, as well as other batteries and devices other than batteries, are required by city or county ordinances to have spill containment devices or other control devices. Additionally, in many cases, insurance carriers require spill containment or control devices to be used when storing batteries or other devices that contain hazardous materials. Other devices that may use spill containment systems include, but are not limited to, air conditioning units that may drip water from condensation or leak Freon, and water heaters that may leak water.

Accordingly, it is desirable to contain leaks and spills from hazardous devices such as batteries. While spill containment systems exist, the existing systems need to be improved and are cost prohibitive in many cases. Conventional spill containment systems are attached to the floor by a larger number of fasteners that penetrate concrete, wood, or tile flooring. Accordingly, installing conventional spill containment systems is very costly, labor intensive, and involves defacing or damaging the floor or substrate. Additionally, many floors in older facilities have asbestos tile and therefore drilling into the floor poses a health hazard due to the release asbestos fibers into the air. Additionally, storage space for battery backup systems is limited and precious. As companies become increasingly dependent on computers, their need for storing a greater number of batteries increases. Real estate, battery cabinets, and relay rack space are at a premium. Thus, companies utilizing battery backup systems would like to be able to store as many batteries as they can in their space, such as a warehouse or basement or other rooms. Some of the rooms may have structures that obstruct the floor space (such as columns); others may have non-rectangular areas. Battery spill containment systems should be able to be installed in virtually any of these diverse rooms. The systems should also be able to be installed quickly and easily in a given space at a low cost, and with minimal effort and time. Additionally, rails of the spill containment systems should provide a reinforced and secure environment around the perimeter of the batteries, but yet have the ability to be removed to allow for maintenance or battery change out as the batteries reach the end of their lives.

Accordingly, it is desirable to have improved designs of a battery spill containment system that permits a greater number of batteries to be stored in a given space (e.g., on relay racks or in cabinets) with easy access to the batteries, increased safety, and modularity of designs that incorporate spill containment.

SUMMARY

The present disclosure is directed to various embodiments of a spill containment system configured to be coupled to a battery rack or any other structure which may leak fluids. The spill containment systems of the present disclosure are also configured to maintain the seismic and structural testing requirements of the battery rack or other structure to which the spill containment system is attached. The spill containment systems of the present disclosure are configured to be coupled to the support structure of the battery rack using an adjustable bracket, rather than the floor, thereby reducing the number of connections required to install the spill containment system. Furthermore, the spill containment systems of the present disclosure are configured to be installed to both new and existing battery racks.

According to one embodiment of the present disclosure, the spill containment assembly includes a series of wall segments coupled together and a series of adjustable clips for coupling the wall segments to the battery rack. Together, the wall segments define a perimeter of a spill containment chamber for containing the fluid leaked from the one or more devices stored on the storage rack. The spill containment assembly may also include a base plate. The base plate and the wall segments together may define the spill containment chamber. The wall segments may include a series of corner wall segments and a series of straight wall segments coupled to the corner wall segments. The straight wall segments and the corner wall segments may cooperate to define a rectangular perimeter of the spill containment chamber. Each of the clips may include an inner vertical flange having an aperture configured to receive a fastener coupling the clips to the storage rack, an upper flange extending outward from an upper end of the inner vertical flange, an outer flange extending downward from an outer end of the upper flange, and a lower horizontal flange extending inward from a lower end of the outer flange. In one embodiment, the clips may include a first component and a second component slidably coupled to the first component. The second component is configured to move between a first position in which the wall segments are spaced from the storage rack by a first distance and a second position in which the wall segments are spaced apart from the storage rack by a second distance. The spill containment assembly may also include an Underwriters Laboratory ("UL") certified liner in the spill containment chamber. The spill containment assembly may also include a liquid detection device or a pH meter for detecting a leak from the one or more devices stored on the storage rack. Additionally, in one embodiment, the spill containment assembly may include a flame proof pillow in the spill containment chamber that conforms to both UL flammability standards and Factory Mutual ("FM") Insurance Company standard FM 4955 for flammability.

The present disclosure is also directed to a storage and spill containment system. In one embodiment, the storage and spill containment system includes a storage rack configured to support one or more devices prone to leaking and a spill containment system configured to contain and neutralize leaks from the one or more devices supported on the storage rack. The storage rack includes a series of front stanchions, a series of rear stanchions, and a series of support braces coupled to the front and rear stanchions. The spill containment system includes a series of wall segments coupled together and a series of adjustable clips coupling the wall segments to a series of stanchions of the storage rack. Together, the wall segments define a perimeter of a spill containment chamber below the storage rack. The perimeter of the spill containment chamber extends around the storage rack. The spill containment system may also include a base plate disposed below the storage rack. Together, the base plate and the wall segments may define the spill containment chamber. The spill containment system may not be connected to the ground.

The present disclosure is also directed to various methods of a spill containment assembly below a storage rack. In one embodiment, the method includes coupling a series of clips to a series of stanchions of the storage rack, and attaching a series of wall segments to the clips. The tasks of coupling the clips to the storage rack and attaching the wall segments to the clips may be performed without coupling the wall segments or the clips to the ground. The method may also include attaching the storage rack to a support surface. The method may also include installing a liner. The task of installing the liner may be performed before attaching the storage rack to the support surface or after attaching the storage rack to the support surface. The task of attaching the storage rack to the support surface may include fastening the storage rack to the support surface through the liner.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 1 is a perspective view of a spill containment assembly according to one embodiment of the present disclosure attached to a non-seismic battery storage rack;

FIG. 3 is an enlarged detail view of a spill containment assembly attached to a battery storage rack.

DETAILED DESCRIPTION

The present disclosure relates to spill containment assemblies and methods of installing the spill containment assemblies onto both new and existing support structures. The spill containment assemblies of the present disclosure are configured to contain leaks and spills from a variety of devices, such as batteries which may leak hazardous materials (e.g., sulfuric acid), air conditioning units which may leak Freon, and hot water heaters which may leak water. Additionally, the spill containment assemblies of the present disclosure are configured to be coupled to the structure which supports the devices, rather than a floor or substrate on which the spill containment assembly rests, thereby reducing installation time, eliminating the risk of drilling into older floors, which typically contain asbestos, and minimizing damage to the floor. Moreover, the spill containment assemblies of the present disclosure are configured to retrofit existing support structures, such as existing battery racks (e.g., the spill containment assemblies are configured to be installed on an existing support structure in situ). The spill containment assemblies of the present disclosure are also configured to be installed during the installation of a new support structure. Furthermore, the spill containment assemblies of the present disclosure are configured to be readily detached from the support structure (e.g., battery rack), such as to facilitate maintenance or replacement of the devices (e.g., batteries) supported on the support structure.

Figure 2A:
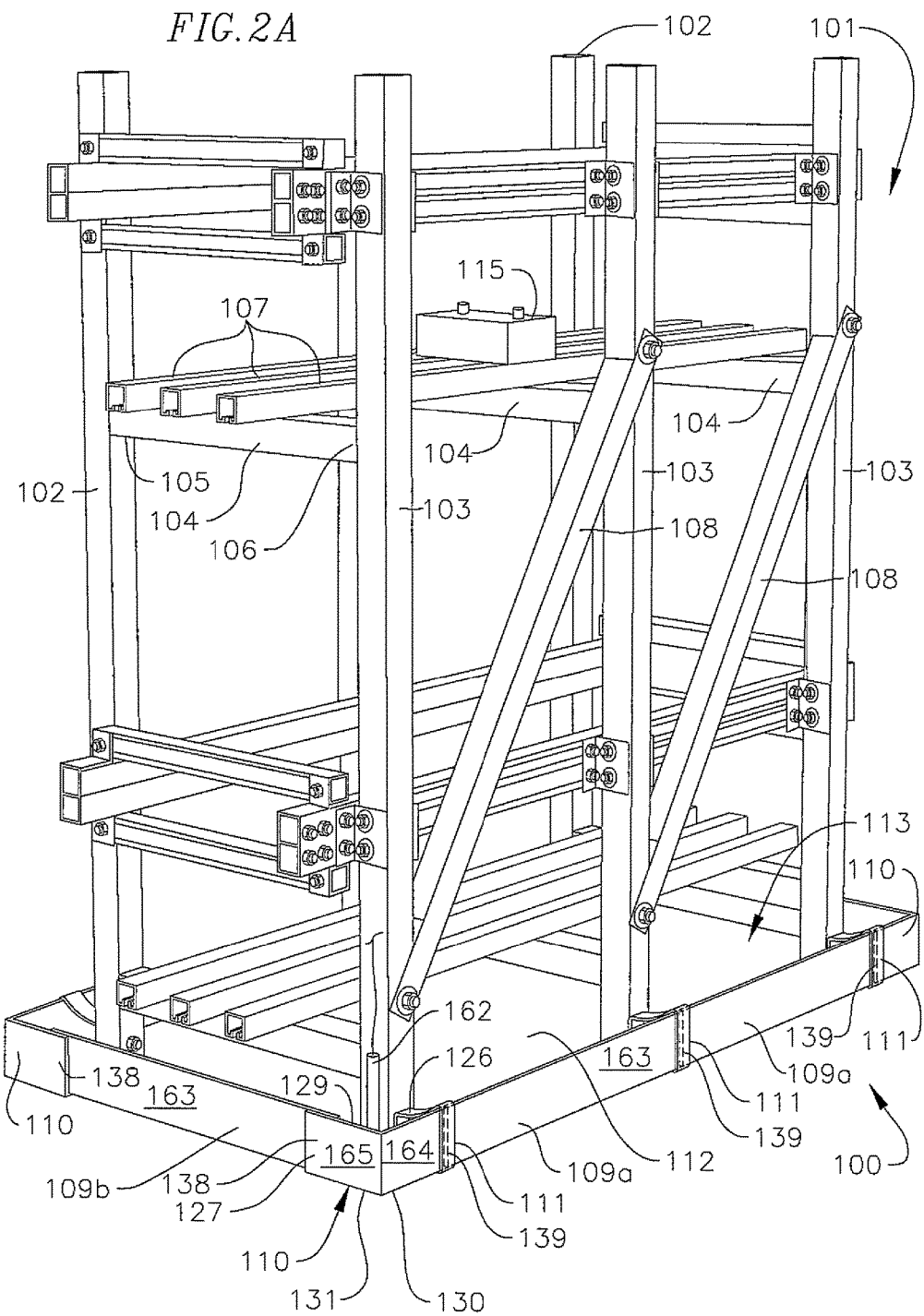
FIG. 2A is a perspective view of a spill containment assembly according to one embodiment of the present disclosure attached to a seismic battery storage rack.

With reference now to FIGS. 1 and 2A, a spill containment assembly 100 according to one embodiment of the present disclosure is illustrated attached to, and installed below, a battery storage rack 101. In FIG. 1, the spill containment assembly 100 is illustrated installed below a non-seismic battery storage rack 101. In FIG. 2, the spill containment assembly 100 is illustrated installed below a seismic-rated battery storage rack 101 configured to meet or exceed seismic shake testing per International Building Code ("IBC") 2009, IBC 2012, and Institute of Electrical and Electronics Engineers ("IEEE") 693. It will be appreciated, however, that the spill containment assembles 100 of the present disclosure may be installed below any other suitable structure in order to contain leaks and spills, such as, for instance air conditioning units or hot water heaters. In the illustrated embodiment, the battery storage racks 101 include a plurality of front and rear support stanchions 102, 103, respectively. Although the front and rear support stanchions 102, 103 in the illustrated embodiment are vertical, in one or more alternate embodiments, the front and rear support stanchions 102, 103 may have any other suitable orientation and configuration. The battery storage racks 101 also include a plurality of horizontal support braces 104 extending between and interconnecting corresponding front and rear vertical support stanchions 102, 103 (i.e., front ends 105 of the horizontal support braces 104 are connected to the front vertical stanchions 102 and rear ends 106 of the horizontal support braces 104 are connected to the rear vertical stanchions 103). The battery storage racks 101 also include a plurality of horizontal rails 107 extending transversely across the horizontal support braces 104. The horizontal rails 107 are configured to support one or more batteries 115. The battery storage racks 101 may also include one or more diagonal braces 108 extending between and interconnecting the vertical support stanchions 102, 103. In one embodiment, the vertical stanchions 102, 103 and the horizontal support braces 104 are square tubes. The vertical stanchions 102, 103 and the horizontal support braces 104, however, may have any other suitable shape, such as, for example, L-shaped, C-shaped, or Z-shaped in transverse cross-section.

With continued reference to the embodiment illustrated in FIGS. 1 and 2A, the spill containment assembly 100 includes a plurality of rails or straight wall segments 109a, 109b, a plurality of corner wall segments 110, a plurality of clips 111, and a base plate 112. Together, the straight wall segments 109a, 109b and the corner wall segments 110 define a generally rectangular border or perimeter of the spill containment assembly 100. Moreover, the straight wall segments 109a, 109b, the corner wall segments 110, the clips 111, and the base plate 112 together define a spill containment chamber or cavity 113 disposed below the battery storage rack 101 and configured to contain any spills or leaks from the batteries 115 stored on the battery storage rack 101.

In the illustrated embodiment, the spill containment assembly 100 includes two straight wall segments 109a along each of the longer sides of the spill containment assembly 100, one straight wall segment 109b along each of the shorter sides of the spill containment assembly 100, and four corner wall segments 110. It will be appreciated, however, that the spill containment assembly 100 may have any other suitable shape and configuration, such as, for example, circular or square, depending upon the configuration of the structure under which the spill containment assembly 100 is installed (e.g., a battery storage rack, an air conditioning unit, or a hot water heater). Additionally, the spill containment assembly 100 may have any other suitable number of straight wall segments 109a, 109b and corner wall segments 110. For instance, in one embodiment, the longer sides and the shorter sides of the spill containment assembly 100 may each include only one straight wall segment 109a, 109b.

Figure 2B:
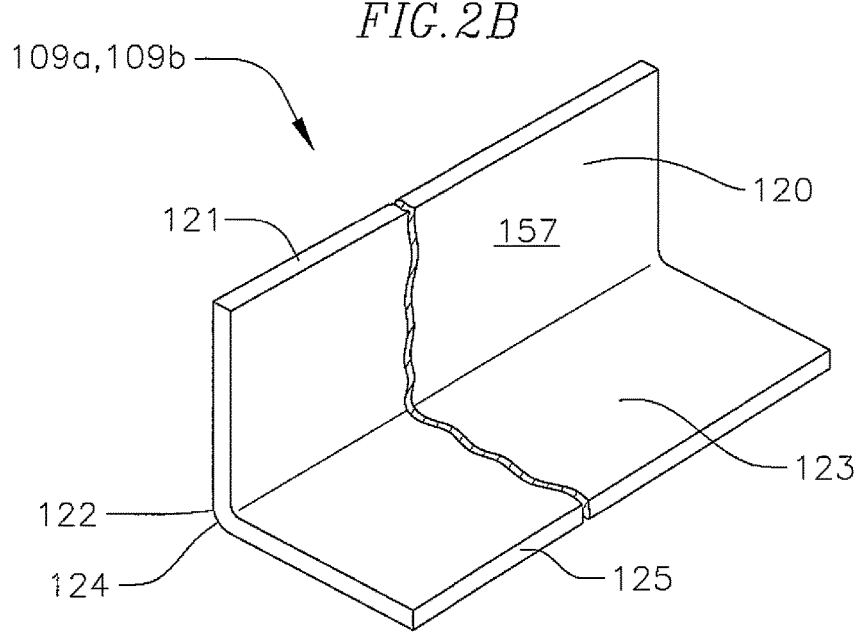
FIGS. 2B and 2C are perspective views of a straight wall segment and a corner wall segment, respectively, of the spill containment assemblies illustrated in FIGS. 1 and 2A.

With reference now to the embodiment illustrated in FIG. 2B, the straight wall segments 109a, 109b each include a vertical flange 120 having an upper end 121 and a lower end 122 opposite the upper end 121 and a horizontal flange 123 projecting inward from the lower end 122 of the vertical flange 120. The horizontal flange 123 includes an outer end 124 interconnected to the lower end 122 of the vertical flange 120 and an inner end 125 opposite the outer end 124. Accordingly, in the illustrated embodiment, the straight wall segments 109a, 109b have an L-shaped cross-section.

Figure 2C:
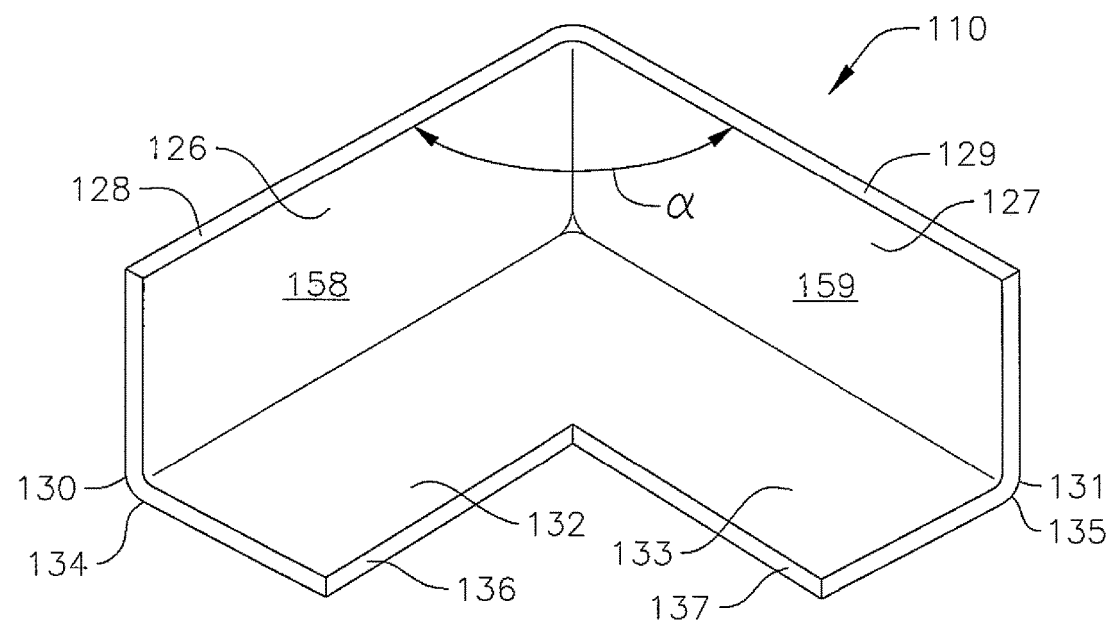

In the embodiment illustrated in FIG. 2C, the corner wall segments 110 each include first and second vertical flanges 126, 127 having upper ends 128, 129, respectively, and lower ends 130, 131, respectively. The corner wall segments 110 each also include first and second horizontal flanges 132, 133 projecting inward from the lower ends 130, 131 of the first and second vertical flanges 126, 127, respectively. The first and second horizontal flanges 132, 133 include outer ends 134, 135 interconnected to the lower ends 130, 131 of the first and second vertical flanges 126, 127, respectively, and inner ends 136, 137 opposite the respective outer ends 134, 135. In the illustrated embodiment, the first and second vertical flanges 126, 127 of the corner wall segments 110 define an angle α of approximately 90 degrees, although it will be appreciated that the first and second vertical flanges 126, 127 may define any other suitable angle depending upon the configuration of the spill containment assembly 100. In an alternate embodiment, the straight wall segments 109a, 109b and the corner wall segments 110 may be provided without the horizontal flanges 123, 132, 133. Additionally, although the straight wall segments 109a, 109b and the corner wall segments 110 have been described above as having vertical flanges 120 and 126, 127, respectively, in one or more alternate embodiments, the flanges 120, 126, 127 may be non-vertical (e.g., the flanges 120, 126, 127 may be canted at any suitable angle, such as, for instance, approximately five degrees to approximately forty-five degrees relative to an imaginary vertical plane). Moreover, in one or more alternate embodiments, the vertical flanges 120, 126, 127 of the wall segments 109a, 109b, 110 may be non-planar (e.g., curved).

With reference again to the embodiment illustrated in FIGS. 1 and 2A, the straight wall segments 109b on the shorter sides of the spill containment assembly 100 overlap a portion of the corner wall segments 110 (i.e., lap joints 138 are defined between the straight wall segments 109b on each of the shorter sides of the spill containment assembly 100 and the corner wall segments 110). Accordingly, two lap joints 138 are defined along each of the shorter sides of the spill containment assembly 100. The overlapping portions of the straight wall segments 109b and the corner wall segments 110 may be coupled together by any suitable means, such as, for example, mechanical fastening, welding, bonding, or adhering. The two straight wall segments 109a on each of the longer sides of the spill containment assembly 100 abut each other and abut the corner wall segments 110 (i.e., butt joints 139 are defined between the two straight wall segments 109a on each of the longer sides of the spill containment assembly 100 and between the straight wall segments 109a and the corner wall segments 110). Accordingly, three butt joints 139 are defined along each of the longer sides of the spill containment assembly 100.

As described in detail below, the plurality of clips 111 are configured to overlap the butt joints 139, thereby coupling together the two straight wall segments 109a along each of the two longer sides of the spill containment assembly 100 and coupling the two straight wall segments 109a to the corner wall segments 110. Additionally, in one embodiment, the clips 111 may be configured to maintain a fluid-tight seal around the butt joints 139 (i.e., the clips 111 may be configured to join the straight wall segments 109a and the corner wall segments 110 together to ensure a fluid-tight fit). It will be appreciated, however, that the clips 111 do not need to maintain a fluid-tight seal around the butt joints 139 as the spill containment assembly 100 includes a liner 114, described in detail below, which is configured to prevent spilled or leaked fluid (e.g., sulfuric acid from batteries) from escaping the spill containment chamber 113 and thereby contaminating surrounding areas. In an alternate embodiment, the straight wall segments 109b on the shorter sides of the spill containment assembly 100 may abut, rather than underlap, the corner wall segments 110 (i.e., butt joints may be defined along the shorter sides of the spill containment assembly 100, similar to the butt joints 139 defined along each of the longer sides of the spill containment assembly 100) and clips 111 may be provided to couple the straight wall segments 109*b* on the shorter sides of the spill containment assembly 100 to the corner wall segments 110.

With reference now to the embodiment illustrated in FIG. 3, the adjustable clip 111 will now be described in more detail. One of the corner wall segments 110 is omitted in FIG. 3 to reveal one of the adjustable clips 111. As illustrated in FIG. 3, each adjustable clip 111 includes an adjustable inner vertical flange 140 having a lower end 141 and an upper end 142 opposite the lower end 141. Each adjustable clip 111 also includes an upper flange 143 projecting outward from the upper end 142 of the inner vertical flange 140, although in one or more alternate embodiments, the flange 143 may project outward from the lower end of the inner vertical flange 140. In one embodiment, the upper flange 143 may be generally horizontal. The upper flange 143 includes an inner end 144 interconnected to the upper end 142 of the inner vertical flange 140 and an outer end 145 opposite the inner end 144. In the illustrated embodiment, the upper flange 143 is arcuate, although it will be appreciated that the upper flange 143 may be straight (e.g., planar) and still fall within the scope and spirit of the present disclosure. Each adjustable clip 111 also includes an outer vertical flange 146 extending downward from the outer end 145 of the upper flange 143. The outer vertical flange 146 includes an upper end 147 interconnected to the outer end 145 of the upper flange 143 and a lower end 148 opposite the upper end 147. Although the outer flange 146 is depicted as a vertical and planar, in one or more alternate embodiments, the flange 146 may not be vertical (e.g., the flange 146 may be canted) and/or the flange 146 may not be planar (e.g., the flange 146 may be curved). In one embodiment, the shape of the outer flange 146 matches or substantially matches the shape of the first vertical flange 126 of the corner wall segment 110 and/or the shape of the vertical flanges 120 of the straight wall segments 109*a*. Each adjustable clip 111 further includes a lower horizontal flange 149 extending inward from the lower end 148 of the outer vertical flange 146. In one embodiment, the lower horizontal flange 149 may rest on the ground or other substrate on which the storage rack 101 is supported. The lower horizontal flange 149 includes an outer end 150 interconnected to the lower end 148 of the outer vertical flange 146 and an inner end 151 opposite the outer end 150. Each adjustable clip 111 also includes a lip 152 extending upward from the inner end 151 of the lower horizontal flange 149. In the illustrated embodiment, the inner vertical flange 140, the upper flange 143, the outer vertical flange 146, the lower horizontal flange 149, and the lip 152 are integrally formed (e.g., by roll forming sheet metal), although in one or more alternate embodiments, the inner vertical flange 140, the upper flange 143, the outer vertical flange 146, the lower horizontal flange 149, and the lip 152 may be separately formed and coupled together by any suitable process, such as, for instance, welding.

With continued reference to the embodiment illustrated in FIG. 3, each adjustable clip 111 also includes an aperture 153 configured to receive a fastener 154 coupling the clip 111 to one of the plurality of stanchions 102, 103 on the battery support rack 101. In the illustrated embodiment, the aperture 153 is a notch or slot defined in the inner vertical flange 140 that extends upward from the lower end 141 of the inner vertical flange 140. It will be appreciated that the slot allows for the vertical adjustability of the clip 111 (i.e., the slot 153 is configured to permit the clip 111 to be adjusted vertically based upon the location of the openings in the vertical stanchions 102, 103 configured to receive the fastener 154 coupling the clip 111 to the vertical stanchion 102, 103). In one embodiment, the stanchions 102, 103 of the battery support rack 101 may include pre-existing holes (e.g., holes configured to attach other components to the stanchions 102, 103) and the slot 153 allows the clips 111 to be adjusted vertically such that the existing holes in the stanchions 102, 103 may also be used to couple the clips 111 to the stanchions 102, 103 of the battery storage rack 101. In another embodiment, new holes may be drilled into the stanchions 102, 103 to attach the adjustable clips 111 (e.g., the stanchions 102, 103 may be retrofitted to include openings configured to receive the fasteners 154 coupling the clips 111 to the stanchions 102, 103 of the battery rack 101). Although the aperture 153 in the illustrated embodiment is a slot, the aperture 153 may have any other suitable shape, such as, for example, a plurality of spaced apart holes. In the illustrated embodiment, the flanges 140, 143, 146, 149 and the lip 152 are all thin plates. Each adjustable clip 111 may be formed by any suitable means, such as, for example, bending, stamping, pressing, machining, molding, extruding, rapid prototyping using additive manufacturing techniques, or any combination thereof. Each clip 111 may be made of any suitably strong material, such as, for example, aluminum, steel, alloys, carbon fiber reinforced plastic, or any combination thereof.

When the spill containment assembly 100 of the present disclosure is installed, the outer vertical flanges 146 on the adjustable clips 111 are configured to overlap the butt joints 139 defined between the straight wall segments 109*a* and the corner wall segments 110, as illustrated in FIGS. 1 and 2A. Accordingly, the adjustable clips 111 are configured to couple together the two straight wall segments 109*a* along each of the two longer sides of the spill containment assembly 100. The adjustable clips 111 are also configured to couple the two straight wall segments 109*a* along each of the two longer sides of the spill containment assembly 100 to the corner wall segments 110. As illustrated in FIGS. 1-3, the adjustable clips 111 are also configured to space the straight wall segments 109*a*, 109*b* and the corner wall segments 110 away from the stanchions 102, 103 of the battery storage rack 101 by a suitable distance, such as, for example, approximately 1 inch to approximately 4 inches (i.e., the adjustable clips 111 are configured to space the border or perimeter of the spill containment assembly 100 away from the stanchions 102, 103 of the battery storage rack 100). Spacing the straight wall segments 109*a*, 109*b* and the corner wall segments 110 away from the battery storage rack 101 may be necessary to comply with various federal, state and/or local regulations. Additionally, the upper flange 143 of the adjustable clip 111 may be configured such that the spacing between the stanchions 102, 103 of the battery storage rack 101 and the wall segments 109*a*, 109*b*, 110 of the spill containment assembly 100 is adjustable.

In addition, the adjustable clips 111 are configured to couple the straight wall segments 109*a*, 109*b* and the corner wall segments 110 to the stanchions 102, 103 of the battery storage rack 101 rather than the floor. Coupling the straight wall segments 109*a*, 109*b* and the corner wall segments 110 to the stanchions 102, 103 of the battery storage rack 101 eliminates the necessity of drilling a series of holes (e.g., hundreds of holes) into the floor or substrate in order to install the spill containment assembly 100 or at least reduces the number of holes that need to be drilled into the floor or substrate to install the spill containment assembly 100. Drilling a series of holes into the floor or substrate may be time consuming, labor intensive, and expensive. Additionally, the floors in many older facilities contain asbestos, and therefore drilling into the floor may release asbestos fibers into the air, thereby posing a health risk to workers. Furthermore, coupling the straight wall segments 109a, 109b and the corner wall segments 110 to the stanchions 102, 103 of the battery storage rack 101 enables cost-effective retrofitting of existing storage racks. Finally, coupling the straight wall segments 109a, 109b and the corner wall segments 110 to the stanchions 102, 103 of the battery storage rack 101 eliminates the necessity of defacing the floor or substrate, such as by drilling holes or applying adhesive.

Figure 5A:
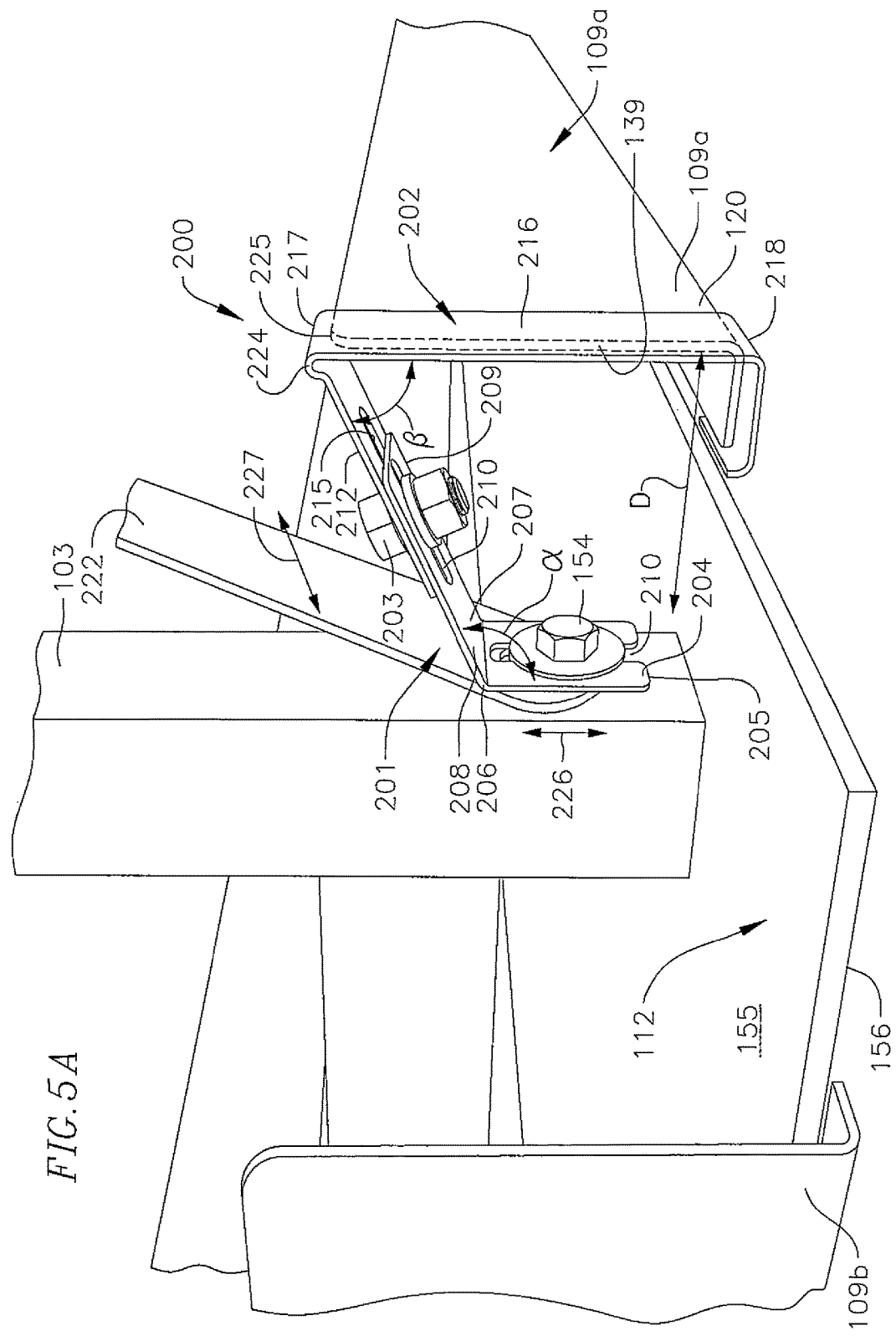
FIGS. 5A and 5B are an enlarged detail view and a cross-sectional view, respectively, of a spill containment assembly according to another embodiment of the present disclosure attached to a battery storage rack.
Figure 5B:
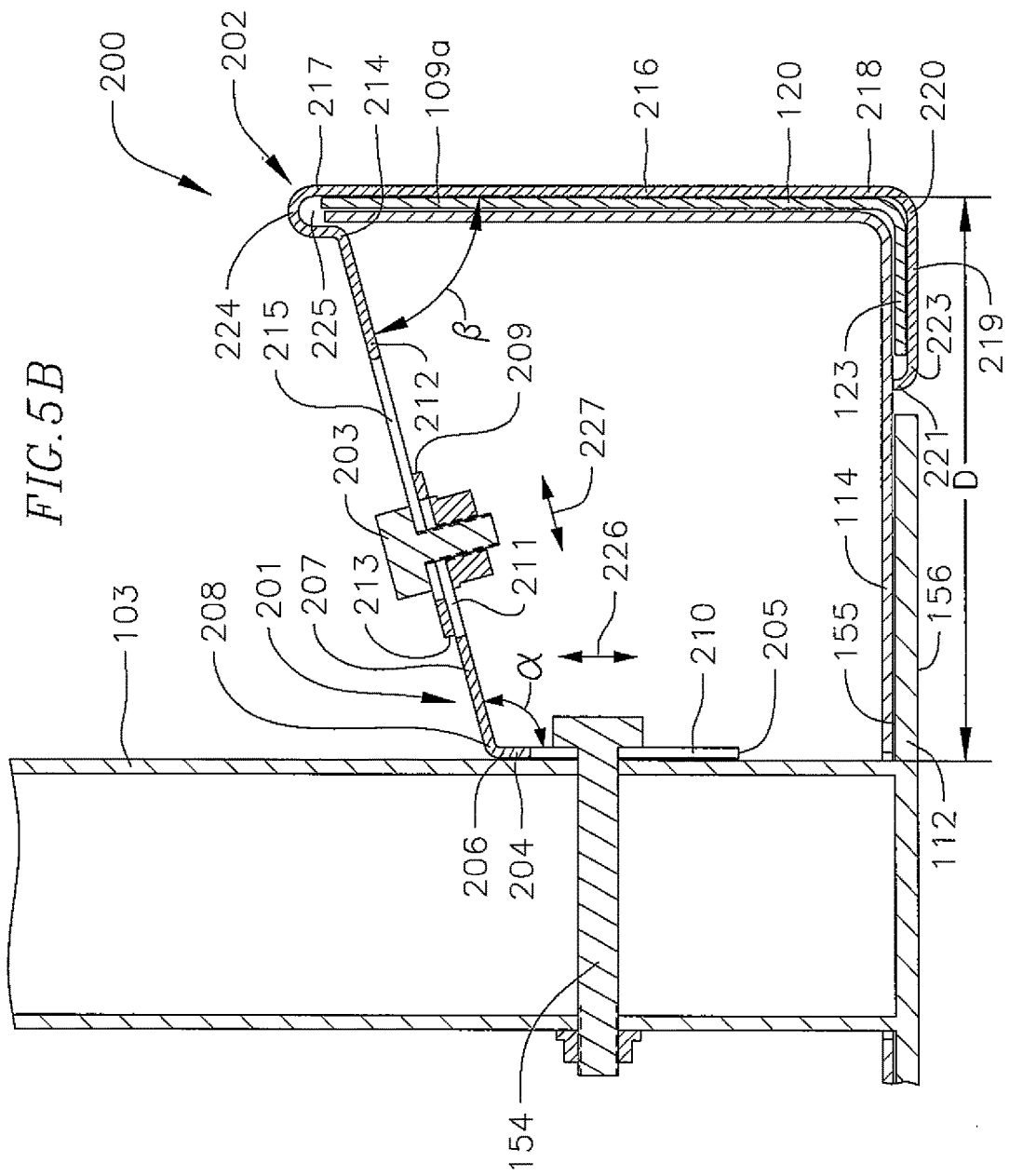

With reference now to FIGS. 5A and 5B, an adjustable clip 200 according to another embodiment of the present disclosure is illustrated. One of the corner wall segments 110 is omitted in FIGS. 5A and 5B to reveal one of the adjustable clips 200. Unlike the clip 111 described above with reference to FIG. 3 that is a single component, the clip 200 illustrated in FIGS. 5A and 5B includes two components 201, 202 configured to be coupled together by a fastener 203. As described in more detail below, the clip 200 is configured to permit the adjustment of both the vertical and horizontal position of the clip 200. Like the clips 111 described above, the clips 200 are configured to couple the straight wall segments 109a, 109b and/or the corner wall segments 110 of the battery spill containment assembly 100 to the stanchions 102, 103 of the battery storage rack 101 rather than the floor. The adjustable clips 200 are also configured to couple the straight wall segments 109a, 109b to each other and to couple the straight wall segments 109a, 109b to the corner wall segments 110.

In the embodiment illustrated in FIGS. 5A and 5B, the first component 201 of the clip 200 includes an adjustable inner vertical flange 204 having a lower end 205 and an upper end 206 opposite the lower end 205. The first component 201 of the clip 200 also includes an upper flange 207 projecting outward from the upper end 206 of the inner vertical flange 204. In one or more alternate embodiments, the flange 207 may project outward from the lower end 205 of the inner vertical flange 204. In the illustrated embodiment, the upper flange 207 defines an obtuse angle α with the inner vertical flange 204, such as, for instance, from approximately 100 degrees to approximately 150 degrees, although it will be appreciated that the upper flange 207 may define any other suitable angle α relative to the inner vertical flange 204, such as, for instance, greater than approximately 150 degrees or less than approximately 100 degrees (e.g., approximately 90 degrees). The upper flange 207 includes an inner end 208 interconnected to the upper end 206 of the inner vertical flange 207 and an outer end 209 opposite the inner end 208. In the illustrated embodiment, the upper flange 207 is straight (e.g., planar), although it will be appreciated that the upper flange 207 may be non-planar (e.g., arcuate) and still fall within the scope and spirit of the present disclosure. In the illustrated embodiment, the upper flange 207 and the inner vertical flange 204 of the first component 201 are integrally formed, although in one or more alternate embodiments, the upper flange 207 and the inner vertical flange 204 may be separately formed and coupled together by any suitable process, such as, for instance, welding.

Still referring to the embodiment illustrated in FIGS. 5A and 5B, the first component 201 of each clip 200 defines an aperture 210 configured to receive a fastener 154 coupling the clip 200 to one of the plurality of stanchions 102, 103 of the battery support rack 101. In the illustrated embodiment, the aperture 210 is a notch or slot extending upward from the lower end 205 of the inner vertical flange 204. It will be appreciated that the slot 210 allows for the vertical adjustability of the clip 200. In particular, the slot 210 is configured to permit the clip 200 to be adjusted vertically (arrow 226) based upon the location of the opening in the stanchion 102, 103 configured to receive the fastener 154 coupling the clip 200 to the battery storage rack 101. For instance, if the stanchion 102, 103 has an existing opening (e.g., an opening for connecting a diagonal support brace 222 of the battery storage rack 101 to the stanchion 102, 103), the slot 210 allows the clip 200 to be adjusted vertically such that the existing opening in the stanchion 102, 103 may also be used to couple the clip 200 to the stanchion 102, 103 of the battery storage rack 101. In another embodiment, new holes may be drilled into the stanchions 102, 103 to attach the clips 200 (i.e., the stanchions 102, 103 may be retrofitted to include openings configured to receive the fasteners 154 coupling the clips 200 to the stanchions 102, 103 of the battery rack 101). Although the aperture 210 in the illustrated embodiment is a slot, the aperture 210 may have any other suitable shape, such as, for example, a plurality of holes. In another embodiment, the aperture 210 in the first component 201 may be a single hole such that the first component 201 of the clip 200 is not configured to be adjusted vertically. In one embodiment, the aperture 210 may be a slot that does not extend completely to the lower end 205 of the inner vertical flange 204. Additionally, as described in more detail below, the upper flange 207 of the first component 201 also includes an aperture or an opening 211, such as, for instance, a slot, configured to receive the fastener 203 coupling, the first component 201 of the clip 200 to the second component 202 of the clip 200.

With continued reference to the embodiment illustrated in FIGS. 5A and 5B, the second component 202 of the clip 200 includes an upper flange 212 having an inner end 213 and an outer end 214 opposite the inner end 213. The upper flange 212 also includes an opening 215. The upper flange 212 of the second component 202 is configured to overlap the upper flange 207 on the first component 201 of the clip 200. In the illustrated embodiment, the upper flange 212 on the second component 202 overlies the upper flange 207 on the first component 201. In an alternate embodiment, the upper flange 212 on the second component 202 may underlie the upper flange 207 on the first component 201 of the clip 200. Additionally, the opening 215 in the second component 202 is configured to at least partially align with the opening 211 in the first component 201 such that the aligned openings 215, 211 may receive the fastener 203 coupling the first and second components 201, 202 together (i.e., the fastener 203 is configured to extend through the openings 215, 211 to couple the first and second components 201, 202 together).

In the illustrated embodiment, the opening 215 in the second component 202 of the clip 200 is a notch or slot extending outward from the inner end 213 of the upper flange 204. It will be appreciated that the slot 215 allows for the horizontal adjustability of the clip 200. In particular, the slot 215 is configured to enable the second component 202 of the clip 200 to be adjusted horizontally based upon a desired distance D between the stanchions 102, 103 of the battery storage rack 101 and the vertical flanges 120 and 126, 127 of the straight wall segments 109a, 109b and the corner wall segments 110, respectively. The horizontal position of the second component 202 of the clip 200 may be adjusted by loosening the fastener 203, sliding (arrow 227) the second component 202 of the clip 200 inward or outward into the desired position, and then retightening the fastener 203. In one embodiment, the slots 211, 215 are configured to allow the distance D between the stanchions 102, 103 and the vertical flanges 120, 126, 127 of the spill containment assembly 100 to be adjusted between approximately 1 inch and approximately 4 inches. It will be appreciated, however, that the slots 211, 215 may be configured such that the distance D may be adjusted between any other suitable range. Additionally, although in the illustrated embodiment the openings 211, 215 in the first and second components 201, 202, respectively, are both slots, the openings 211, 215 may have any other suitable shapes. For instance, in one embodiment, the opening 211 in the first component 201 may be a circular hole and the opening 215 in the second component 202 may be a slot. In another embodiment, the opening 211 in the first component 201 may be a slot and the opening 215 in the second component 202 may be a circular hole. In other embodiments, the openings 211, 215 in the first and second components 201, 202, respectively, may each be a plurality of holes.

Still referring to the embodiment illustrated in FIGS. 5A and 5B, the second component 202 of each clip 200 also includes an outer vertical flange 216 extending downward from the outer end 214 of the upper flange 212. The outer vertical flange 216 includes an upper end 217 interconnected to the outer end 214 of the upper flange 212 and a lower end 218 opposite the upper end 217. In the illustrated embodiment, the upper flange 212 defines an acute angle β with respective the outer vertical flange 216, such as, for instance, from approximately 80 degrees to approximately 30 degrees, although it will be appreciated that the upper flange 212 may define any other suitable angle β, such as, for instance, greater than approximately 80 degrees (e.g., approximately 90 degrees). Although the outer flange 216 is depicted as a vertical and planar, in one or more alternate embodiments, the flange 216 may not be vertical (e.g., the flange 216 may be canted) and/or the flange 216 may not be planar (e.g., the flange 216 may be curved). In one embodiment, the shape of the outer flange 216 matches or substantially matches the shape of the first vertical flange 126 of the corner wall segment 110 and/or the shape of the vertical flanges 120 of the straight wall segments 109a.

The second component 202 of each clip 200 further includes a lower horizontal flange 219 extending inward from the lower end 218 of the outer vertical flange 216. In one embodiment, the lower horizontal flange 219 may rest on the ground or other substrate on which the storage rack 101 is supported. The lower horizontal flange 219 includes an outer end 220 interconnected to the lower end 218 of the outer vertical flange 216 and an inner end 223 opposite the outer end 220. Each adjustable clip 200 also includes a lip 221 extending upward from the inner end 223 of the lower horizontal flange 219. In the embodiment illustrated in FIGS. 5A and 5B, the second component 202 also includes an inverted U-shaped flange 224 provided between the outer end 214 of the upper flange 212 and the upper end 217 of the outer vertical flange 216. The inverted U-shaped flange 224 defines a cavity 225 configured to receive upper portions of the straight wall segments 109a and the corner wall segments 110. The cavity 225 defined by the inverted U-shaped flange 224 is configured to aid in retaining the straight wall segments 109a and the corner wall segments 110 and in maintaining the proper position and alignment of the straight wall segments 109a and the corner wall segments 110. In the illustrated embodiment, the upper flange 212, the inverted U-shaped flange 224, the outer vertical flange 216, the lower horizontal flange 219, and the lip 221 are integrally formed, although in one or more alternate embodiments, the upper flange 212, the inverted U-shaped flange 224, the outer vertical flange 216, the lower horizontal flange 219, and the lip 221 may be separately formed and coupled together by any suitable process, such as, for instance, welding.

In the embodiment in which the upper flange 212 defines an angle β other than 90 degrees relative to the outer vertical flange 216, it will be appreciated that sliding (arrow 227) the second component 202 inward or outward to adjust the horizontal position of the second component 202 also adjusts the vertical position of the second component 202 (i.e., adjusting the horizontal position of the second component 202 to achieve the desired distance D between the stanchions 102, 103 of the battery storage rack 101 and the vertical flanges 120 and 126, 127 of the straight wall segments 109a, 109b and the corner wall segments 110, respectively, also changes the vertical position of the second component 202). Accordingly, in one embodiment, the vertical position of the first component 201 may be adjusted (arrow 226) to compensate for the change in vertical position of the second component 202 from sliding (arrow 227) the second component 202 inward or outward.

With reference now to the embodiment illustrated in FIGS. 3 and 5A, the base plate 112 is a generally rectangular plate having an upper surface 155 and a lower surface 156 opposite the upper surface 155. The lower surface 156 of the base plate 112 is configured to rest on the ground or floor and the battery storage rack 101 is configured to rest on the upper surface 155 of the base plate 112. The base plate 112 may be made of any suitable material, such as, for example, rubber, aluminum, steel, carbon fiber reinforced plastic, polyvinyl chloride (PVC) coated rubber, or any combination thereof.

Figure 4A:
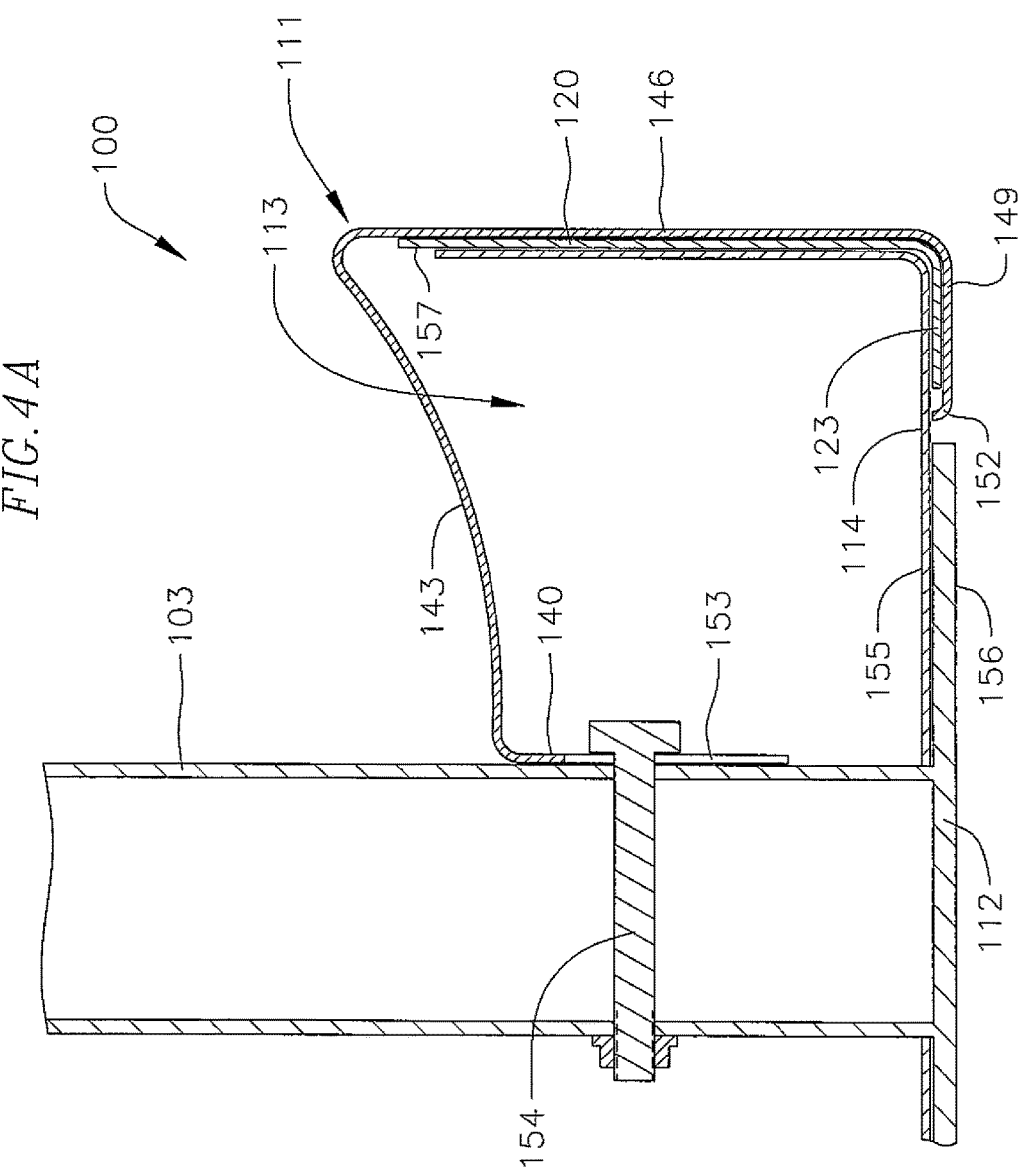
FIG. 4A is a cross-sectional view of a spill containment assembly according to one embodiment of the present disclosure, illustrating a liner in a first configuration.
Figure 4B:
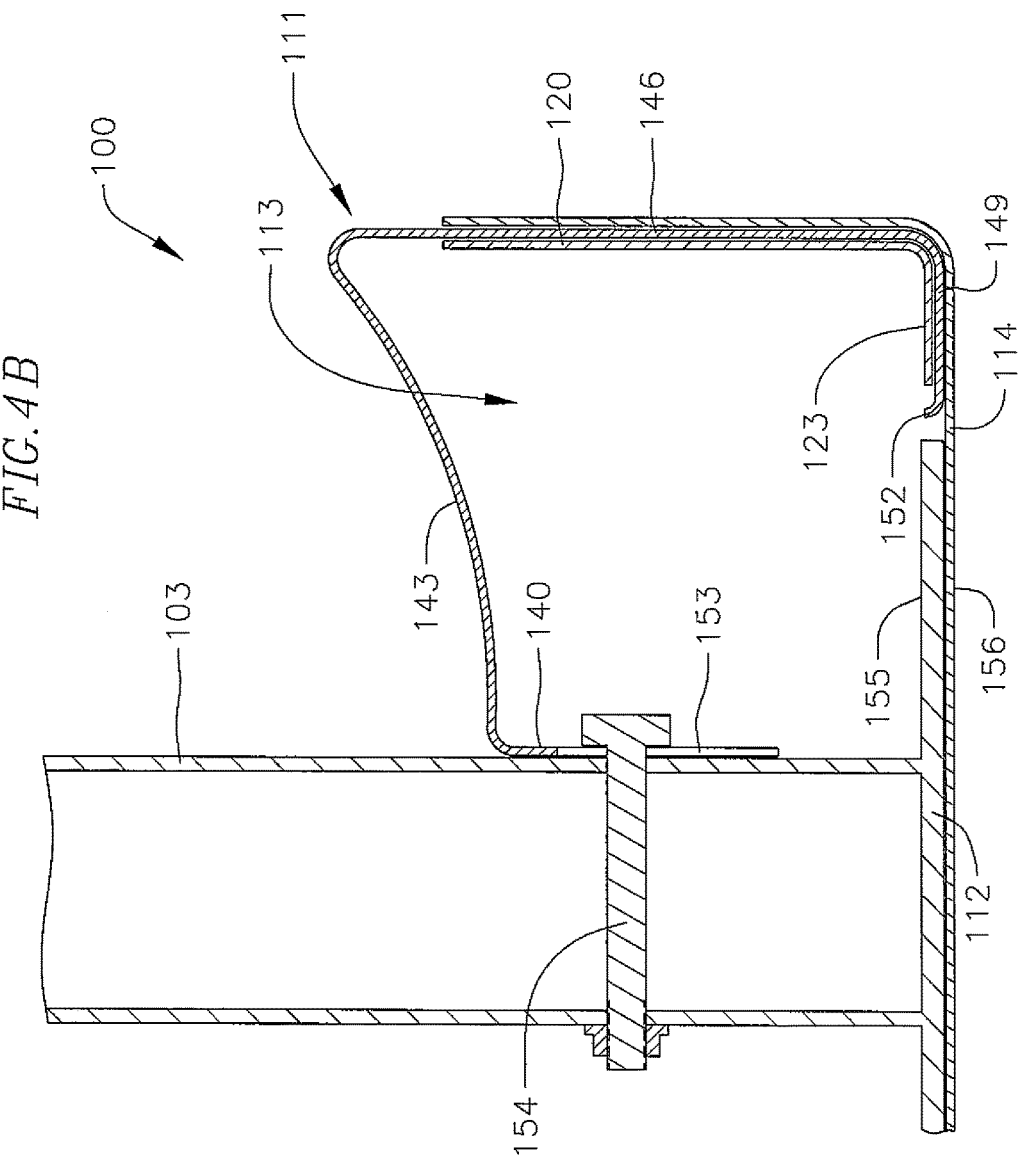
FIG. 4B is a cross-sectional view of a spill containment assembly according to one embodiment of the present disclosure, illustrating a liner in a second configuration.
Figure 4C:
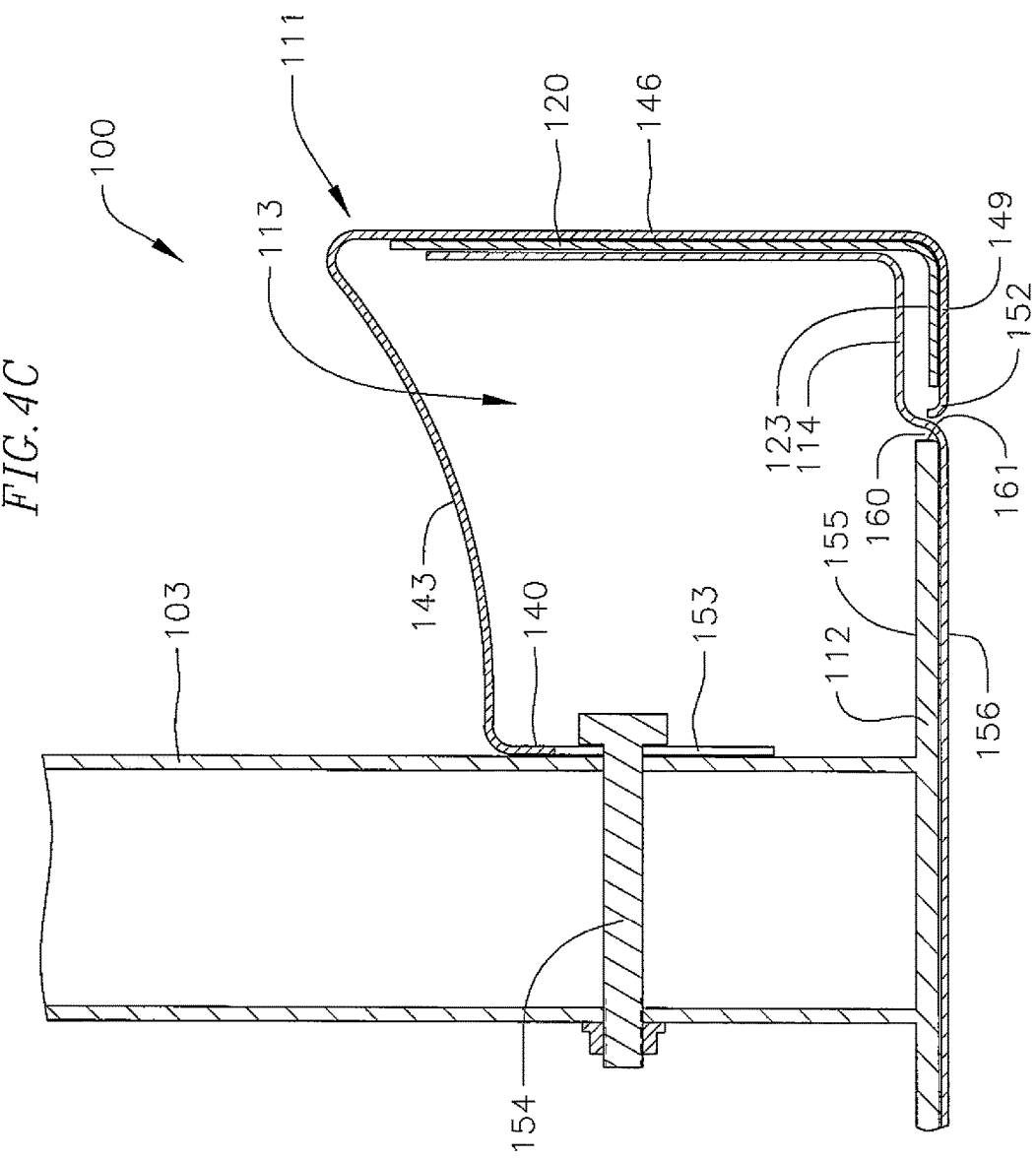
FIG. 4C is a cross-sectional view of a spill containment assembly according to one embodiment of the present disclosure, illustrating a liner in a third configuration.

With reference now to the embodiment illustrated in FIGS. 4A-4C, the spill containment assembly 100 also includes an Underwriters Laboratory ("UL") certified liner 114. The UL certified liner 114 provides a liquid-tight seal that is configured to prevent spilled or leaked fluid (e.g., sulfuric acid from batteries) from escaping the spill containment chamber 113 defined by the spill containment assembly 100 and thereby prevent the spilled or leaked fluid from contaminating surrounding areas. The liner 114 may be made of any material having a suitably high chemical resistivity to caustic and otherwise hazardous fluids, such as, for example, polyvinyl chloride (PVC).

In the embodiment illustrated in FIG. 4A, the liner 114 extends along the upper surface 155 of the base plate 112 and up along at least a portion of the inside surfaces 157, 158, 159 (see FIGS. 2B and 2C) of the vertical flanges 120 and 126, 127 of the straight wall segments 109a, 10% and the corner wall segments 110, respectively, that face the battery storage rack 101. In this embodiment, the battery storage rack 101 may be first bolted to the floor or substrate and then the wall segments 109a, 109b, and 110 may be coupled to the battery storage rack 101 by installing the clips 111 or 200. In particular, the spill containment assembly 100 may be attached to the battery storage rack 101 by installing the bolts 154 coupling the clips 111 or 200 to the stanchions 102, 103 of the battery storage rack 101 and then snapping the wall segments 109a, 109b, and 110 into engagement with the clips 111 or 200. The liner 114 may then be installed in the spill containment chamber or cavity 113 defined by the spill containment assembly 100 by applying the liner 114 along the upper surface 155 of the base plate 112 and then turning up the edges of the liner 114 such that the liner 114 covers at least a portion of the inside surfaces 157, 158, 159 of the vertical flanges 120 and 126, 127 of the straight wall segments 109a, 109b and the corner wall segments 110, respectively.

In the embodiment illustrated in FIG. 4B, the liner 114 is first provided along the floor or substrate and the battery storage rack 101 is bolted to the floor or substrate through the liner 114 such that the liner 114 extends along the lower surface 156 of the base plate 112. The wall segments 109a, 109b, and 110 may then be coupled to the battery storage rack 101 by installing the clips 111 or 200 (i.e., installing the bolts 154 coupling the clips 111 or 200 to the stanchions 102, 103 of the battery storage rack 101 and then snapping the wall segments 109a, 109b, and 110 into engagement with the clips 111 or 200). Finally, edges of the liner 114 may be turned upwards such that the liner 114 covers outer surfaces 163, 164, 165 (see FIG. 2A) of the vertical flanges 120 and 126, 127 of the straight wall segments 109a, 109b and the corner wall segments 110, respectively, that face away from the battery storage rack 101.

In the embodiment illustrated in FIG. 4C, the liner 114 is first provided along the floor or substrate and the battery storage rack 101 is then bolted to the floor or substrate through the liner 114 such that the liner 114 extends along the lower surface 156 of the base plate 112. Edges of the liner 114 are then turned upwards before the wall segments 109a, 109b, and 110 and the clips 111 or 200 are installed. The wall segments 109a, 109b, and 110 are then coupled to the battery storage rack 101 by installing the clips 111 or 200 (i.e., installing the bolts 154 coupling the clips 111 or 200 to the stanchions 102, 103 of the battery storage rack 101 and then snapping the wall segments 109a, 109b, and 110 into engagement with the clips 111 or 200). After the wall segments 109a, 109b, 110 and the clips 111 or 200 are coupled to the battery storage rack 101, the upwardly turned edges of the liner may be applied or pressed against the inside surfaces 157, 158, 159 of the vertical flanges 120 and 126, 127 of the straight wall segments 109a, 109b and the corner wall segments 110, respectively. Accordingly, in this embodiment, the liner 114 extends along the lower surface 156 of the base plate 112, through a gap 160 between the lip 152 or 221 on the clip 111 or 200 and an edge 161 of the base plate 112, and then up along at least a portion of the inside surfaces 157, 158, 159 of the vertical flanges 120 and 126, 127 of the straight wall segments 109a, 109b and the corner wall segments 110, respectively.

Accordingly, it will be appreciated that the liner 114 may be provided completely inside the spill containment chamber or cavity 113 (FIG. 4A), partially inside the spill containment chamber or cavity 113 (FIG. 4C), or completely outside the spill containment chamber or cavity 113 (FIG. 4B) defined by the spill containment assembly 100.

In one embodiment, the spill containment assembly 100 may also include one or more spill containment pillows (not shown) configured to absorb spilled or leaked fluids, such as battery acid, and to neutralize the spilled or leaked fluid to a PH of 7 to 9. The spill containment pillows may be provided in the spill containment chamber or cavity 113 defined by the straight wall segments 109a, 109b, the corner wall segments 110, and the base plate 112 of the spill containment assembly 100. Additionally, the spill containment pillows may be provided on top of the liner 114. In one embodiment, the spill containment pillow is filled with an absorbent and acid neutralizing material and includes a flame retardant covering configured to limit flame spread across the exterior of the pillow. In one embodiment, the flame retardant pillow covering is configured to meet or exceed Underwriters Laboratory ("UL") Class 1 requirements for flammability, Factory Mutual ("FM") fire standard FM 4955 when tested in accordance with ASTM-E2058 and UL recognized requirements, and the requirements of ASTM-E648. The spill containment pillow may be made of any suitable materials, such as, for example, a blend of polyester fibers and flame retardant fibers. The spill containment pillow may be fabricated by any suitable process, such as, for instance, a needle punch fabrication process. Additionally, in one embodiment, the fabric of the spill containment pillow may include interwoven thicker and thinner polyester fibers configured to prevent chemicals (e.g., battery acid) from leaking out of the spill containment pillow. In one embodiment, the fabric of the spill containment pillow may be blend of 35% flame retardant fibers and 65% standard polyester fibers. The flame retardant may be applied to the polyester fibers by any suitable process (e.g., the polyester fibers may be treated with a flame retardant chemical additive). The material of the spill containment pillows may also be configured to stain a particular color when a leaked fluid (e.g., battery acid or other caustic material) contacts the spill containment pillows, thereby providing a visual indication to personnel that a leak has occurred.

In one embodiment, the spill containment assembly 100 may also include one or more liquid detection devices and/or pH meter probes 162. The liquid detection devices and/or pH meter probes 162 may be coupled to either the storage rack 101 (e.g., one of the stanchions 102, 103, as illustrated in FIG. 1) or the spill containment assembly 100 (e.g., one of the straight wall segments 109a, 109b or one of the corner wall segments 110). The liquid detection devices and/or pH meter probes 162 may be positioned to extend into the spill containment chamber 113 to detect the presence of a liquid (e.g., battery acid) that has leaked from one of the devices (e.g., a battery 115) supported by the storage rack 101 down into the spill containment chamber 113. The liquid detection devices and/or pH meter probes 162 may be wired back to a relay that, when the circuit is closed, sends an alarm indicating that leaking liquid (e.g., battery acid) has been detected in the spill containment assembly 100. Additionally, the liquid detection devices and/or pH meter probes 162 may be linked to a central alarm system to alert fire department personnel, security personnel, or property owners that a leak has been detected.

While the present disclosure has been described with respect to a limited number of embodiments, those skilled in the art, having benefit of this disclosure, will appreciate that other embodiments and modifications can be devised which do not materially depart from the scope of the invention as disclosed herein. All such embodiments and modifications are intended to be included within the scope of this disclosure as defined in the following claims. Additionally, although relative terms such as "outer," "inner," "upper," "lower," "below," "above," "vertical, "horizontal" and similar terms have been used herein to describe a spatial relationship of one element to another, it is understood that these terms are intended to encompass different orientations of the various elements and components of the device in addition to the orientation depicted in the figures.

What is claimed is:

1. A spill containment assembly attachable to a storage rack for containing a leaked fluid from one or more devices stored on the storage rack, the spill containment assembly comprising:
   a plurality of wall segments coupled together, wherein the plurality of wall segments together define a perimeter of a spill containment chamber for containing the leaked fluid, the plurality of wall segments comprising a first wall segment coupled to a second wall segment at a joint; and a clip comprising an inner vertical flange with a vertical slotted aperture, an outer vertical flange spaced apart from the inner vertical flange, and an upper flange spanning between and connecting the inner vertical flange to the outer vertical flange, and a lower flange extending from the outer vertical flange opposite the upper flange;

wherein a fastener is inserted through the vertical slotted aperture to permit the inner vertical flange to slide relative to the fastener prior to the fastener being tightened to permit adjustment of the clip;

and wherein the first wall segment is held by the clip with the first wall segment positioned between the outer vertical flange and the inner vertical flange to secure the position of the first wall segment.

2. The spill containment assembly of claim 1, further comprising a base plate, wherein the base plate and the plurality of wall segments together define the spill containment chamber.

3. The spill containment assembly of claim 1, wherein the plurality of wall segments comprises:
a plurality of corner wall segments; and
a plurality of straight wall segments coupled to the corner wall segments.

4. The spill containment assembly of claim 3, wherein the plurality of straight wall segments and the plurality of corner wall segments cooperate to define a rectangular perimeter of the spill containment chamber.

5. The spill containment assembly of claim 1, wherein the upper flange comprises:
a first component extending from the inner vertical flange and having a first slot; and
a second component extending from the outer vertical flange and having a second slot, the second component slidably coupled to the first component by a second fastener inserted through the first slot and the second slot to selectively tighten the first component to the second component;

wherein the second component adapted to move between a first position and a second position moving the plurality of wall segments.

6. The spill containment assembly of claim 1, further comprising a liner in the spill containment chamber.

7. The spill containment assembly of claim 1, further comprising one or both of a liquid detection device or a pH meter for detecting a leaked fluid leak.

8. The spill containment assembly of claim 1, wherein the joint between the first wall segment and the second wall segment is a butt joint, the outer vertical flange of the clip overlapping the joint and fluidly sealing the joint.

9. A spill containment assembly for containing a leaked fluid comprising:
a plurality of wall segments coupled together, wherein the plurality of wall segments together define a perimeter of a spill containment chamber, the plurality of wall segments comprising a first wall segment coupled to a second wall segment; and a clip comprising an inner vertical flange with a vertical slotted aperture, an outer vertical flange spaced apart from the inner vertical flange, and an upper flange spanning between and connecting the inner vertical flange to the outer vertical flange, and a lower flange extending from the outer vertical flange opposite the upper flange;

wherein a fastener is inserted through the vertical slotted aperture to permit the inner vertical flange to slide relative to the fastener prior to the fastener being tightened to permit adjustment of the clip;

and wherein the first wall segment is held by the clip with the first wall segment positioned between the outer vertical flange and the inner vertical flange to secure the position of the first wall segment.

10. The spill containment assembly of claim 9 wherein the first wall segment is coupled to the second wall segment at a joint, the outer vertical flange of the clip overlapping the joint.

* * * * *